United States Patent [19]
Auffret

[11] Patent Number: 5,589,967
[45] Date of Patent: Dec. 31, 1996

[54] METHOD AND DEVICE FOR TRANSMITTING AND SWITCHING PACKETS IN AN OPTICAL NETWORK

[75] Inventor: René Auffret, Perros Guirec, France

[73] Assignee: France Telecom Etablissement Autonome de Droit Public, Paris, France

[21] Appl. No.: 364,089

[22] Filed: Dec. 27, 1994

[30] Foreign Application Priority Data

Jan. 7, 1994 [FR] France ................................. 94 00114

[51] Int. Cl.$^6$ ................................. H04J 4/00; H04J 14/00
[52] U.S. Cl. ........................................ 359/123; 359/127
[58] Field of Search ........................... 359/117, 123, 359/127, 128, 133, 139, 158

[56] References Cited

U.S. PATENT DOCUMENTS

| | | | |
|---|---|---|---|
| 3,604,936 | 9/1971 | Kompfner | 250/199 |
| 5,309,266 | 5/1994 | Jacob et al. | 359/139 |
| 5,404,240 | 4/1995 | Nishio et al. | 359/123 |
| 5,416,769 | 5/1995 | Karol | 359/117 |

FOREIGN PATENT DOCUMENTS 0497667  8/1992  European Pat. Off. .

OTHER PUBLICATIONS

ICC 89, vol. 1, Jun. 1987, Seattle, pp. 1585–1592, L. T. Wu et al., "Dynamic TDM—A Packet Approach To Broadband Networking".

Computing In High Energy Physics '92, Sep. 1992, Annecy, FR, pp. 705–708, N. Ujiie et al., "A New Concept of Multiplexed Optical Readout Transmission System To Hep Experiment".

Electronics Letter, vol. 29, No. 12, Jun. 1993, Stevenage, GB, pp. 1053–1054, J. Yao et al., "Time Slot Interchanging Using Semiconductor Laser Amplifiers".

Infocom '92, vol. 3, May 1992, Florence, IT, pp. 2144–2150, A. Ganz et al., "A Time–Wavelength Assignment Algorithm For A WDM Star Network".

IEEE Photonics Technology Letters, vol. 4, No. 1, Jan. 1992, New York, pp. 69–72, K. Inoue et al., "Wavelength Conversion Experiment Using Fiber Four–Wave Mixing".

Primary Examiner—Wellington Chin
Assistant Examiner—Kinfe-Michael Negash
Attorney, Agent, or Firm—Pearne, Gordon, McCoy & Granger

[57] ABSTRACT

The present invention concerns a method for transmitting and switching packets in an optical network embodying a synchronous time-division multiplexing, the packets being transmitted at a given speed and the rate being determined by the line occupation time.

The present invention also concerns a device for transmitting and switching packets in an optical network.

2 Claims, 11 Drawing Sheets

METHOD AND DEVICE FOR TRANSMITTING AND SWITCHING PACKETS IN AN OPTICAL NETWORK

BACKGROUND OF THE INVENTION

1. Field of the Invention

The present invention concerns a method and device for transmitting and switching packets in an optical network.

2. Description of Related Art

The monomode optical fiber is increasingly being used in telecommunications networks. In the near future, it is probable that the user shall have direct access to the monomode fiber. From now on, the capacity continuity of the channel between any two subscribers shall be effective. The costs of optical transmitters and receivers scarcely depend on the information rate. Thus, it is possible to envisage modulating the extremely high rate sources and fix the capacity of a channel by the occupation time determined by the ratio between the period of the packet and the time separating two successive packets.

But the introduction of optics in the functions of the network is currently adversely affecting the structure of Asynchronous Transfer Mode (ATM) and SDH time-division signals where these functions accompany highly elaborate management and processing devices beyond the range of optics.

An article by J. P. Coudreuse, G. Pays and M. Trouvat and entitled the asynchronous time-division technique (Switching and Transmission, No 3, 1990) describes the Asynchronous Transfer Mode (ATM) which is defined to satisfy three criteria; digital technique, high rate and flexibility. This is a hybrid technique between the switching of circuits for which it retains simplicity (gauge of extremely high rates) and the switching of packets for which it assumes flexibility. This is the culmination of various convergent and intermediate evolutions which became operational over the last few years; rapid switching of circuits so as to attempt to resolve the switching of huge amounts of information and the rapid switching of packets to increase the processed rate by simplifying the protocol layers (frame switching, frame relaying).

The difficulty of introducing optics into the other functions of the network paradoxically results in its success in transmission. In fact, the reduction of the cost of the telephone channel each time the rate rises, together with the extremely large passband of the fiber, have caused transmission systems to be developed even faster. It is nevertheless another approach to increase the capacity of an optical network, one which favors the parallelism of circuits in a given optical conduit by wavelength multiplexing. This approach, still deferred on transmission for cost reasons, shall shortly be used for direct detection systems with rates of 10 Gbit/s, indeed more, where the limits of the monomode fiber are reached.

An article by H. Paciullo entitled "Multicolored optical networks" (Echo des Recherches, No 146, 4th quarter 1991) defines the concept of multicolored networks. These multicolored networks are mainly characterized by the fact that they use a large number of wavelengths or optical frequencies for embodying communication networks. This concept has been able to be developed owing to the emergence of the monomode optical fiber which has an extremely large passband (several thousands of gigahertz in the third window around 1.5 µm) and by the development in a laboratory of new optical and optoelectronic components. The main originality of these techniques resides, not merely in the quantitative aspect (capacity of networks having nothing in common with those currently existing), but also in the fact that in this instance the wavelength may be regarded as a network element and that accordingly network operating and management functions may be directly applied to all the wavelengths.

The multicolored optical networks offer an original solution to the ever-increasing needs of networks in terms of capacity. However, they require sophisticated optical components, some of the latter still being at the research stage and this is why this type of network is not currently being exploited commercially.

These arguments concerning costs are to be reconsidered before fully organizing a network. The coherent detection systems have resulted in proposals for organizing a multicolored network. However, technological immaturity has prevented this network from being produced.

The object of the present invention is to provide a new organization of the functions of an optical network able to mitigate these various drawbacks.

SUMMARY OF THE INVENTION

The present invention concerns a method for transmitting and switching packets in an optical network, wherein a synchronous time-division multiplexing is embodied, the packets being transmitted at a given speed and the rate determined by the line occupation time, and wherein the allocation of time windows is effected from a central device so that all the packets have a switching matrix at appropriate instants.

The invention also concerns a switching and transmission method in which the parallelism of multicolored multiplexing is associated with synchronous time-division multiplexing, the synchronous packets being organized in a "matrix" frame formed in abscissae of the various sampling instants and in ordinates of the various wavelengths representing the parallelism level of the packet, each being marked in said matrix by its sampling window and its level of parallelism.

The method of the invention carries out the following three operations:

the coloring of tributaries by optical transposition;

the mixing of channels;

the selection of channels by filtering.

So as to color the tributaries, a transposition function is able to optically transfer the information from one wavelength to another by using one of the following techniques:

offsetting the transmission frequency of a laser;

a four wavelength mixture in the semiconductive amplifiers;

non-linearity of the gain in the semi-conductive amplifiers;

gain switching in the semiconductive amplifiers in an optical loop:synthesizer/transposer.

The transmission method of the invention defined above has a large number of advantages and in particular:

it allows for access at any location of the network to any channel from N channels;

it is transparent to any digital format (in the case of a transposition by saturation of the gain);

it has a potential capacity which depends solely on the rate of the tributaries, provided the size of the network has been defined, by taking into account the transmission performances by the maximum rate of these tributaries.

it can simultaneously admit tributaries with different rates;

it is adapted to an evolution rendering it coherent.

The invention also concerns a device for transmitting and switching packets in an optical network which may comprise a transposer including the following elements:

N optical couplers (2 to 1), one of the branches of each coupler receiving a tributary with the wavelength λA, the other a continuous emission of a "coloring" laser with λi, followed by N semiconductive optical amplifiers at the output of which the signal on the wavelength λA and its complement on the wavelength λi are obtained;

an N to 1 mixer;

an optical fiber;

a 1 to N coupler comprising on each of its outputs a rejecter filter which eliminates the wavelength λA.

Advantageously, the device of the invention includes transposer/synthesizers able to carry out the two functions of a tuneable laser and a transposer amplifier. Each of the these includes a semiconductive optical amplifier whose residual reflectivity of the faces has been intentionally kept to a value so that it generates a modulation of the spectrum of the spontaneous emission placed in an optical fiber loop including an optical isolator and a tuneable Fabry Perot filter, this unit forming a laser which emits a wavelength λi (i=1 to N) each time the filter coincides with any one of the resonances of the spontaneous emission.

In one advantageous embodiment, the device of the invention includes a buffer memory connected to an alternative laser by a read connection and a write connection, this laser being also connected by means of an optical fiber to a transposition stage including an amplifier and a tuneable laser 64 λ and to another laser. A selection module of the time Fi and allocation λj window is connected to this transposition stage and to this laser.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

One first embodiment of the invention concerns an organization based on a synchronous time-division multiplexing for rates of between 2 and 140 bit/s. In this synchronous time-division multiplexing, the packets are emitted at the same speed and the rate is determined by the line occupation time.

Having regard to the high transmission capacity of an optical fiber, it is assumed that all the optical transmitters and receivers operate at the rate of 140 MBit/s. The rate of a channel is determined by the product of the number of pulses contained in the packet by the frequency of occurence of the latter. In the case of the 140 MBit/s retained as a "full" rate, the packets meet. The ratio K between the period of a packet and the gap between two successive packets varies according to the following rates: 2 Mbit/s: K=1/64; 8 Mbit/s:K=1/16, 34 Mbit/s:k=1/4, 140 Mbit/s:k=1. The period of the packet depends on the capacity of the optical memory or the optical delays which are generated.

Figure 1A:
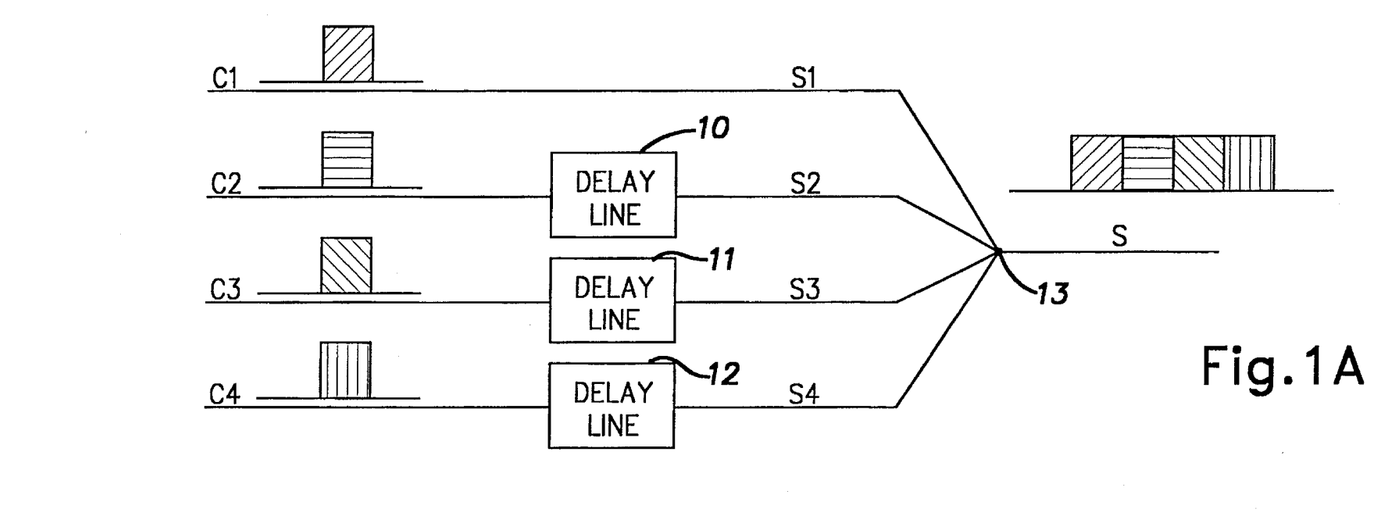
FIGS. 1A and 1B illustrate the structure and functioning of a time-division multiplexer.

FIG. 1A illustrates the structure of a time-division multiplexer, 4 to 1, which is formed of monomode fiber delay lines 10, 11, 12 coupled to a 4 to 1 optical mixer 13. The delays allocating three of the four branches of the coupler are respectively: R (line 10), 2R (line 11), 3R (line 12). The delay R corresponds to the period (t) of the elementary packet. With the input signals C1, C2, C3 and C4, delayed signals S1, S2, S3 and S4 and an output signal S are obtained.

Figure 1B:
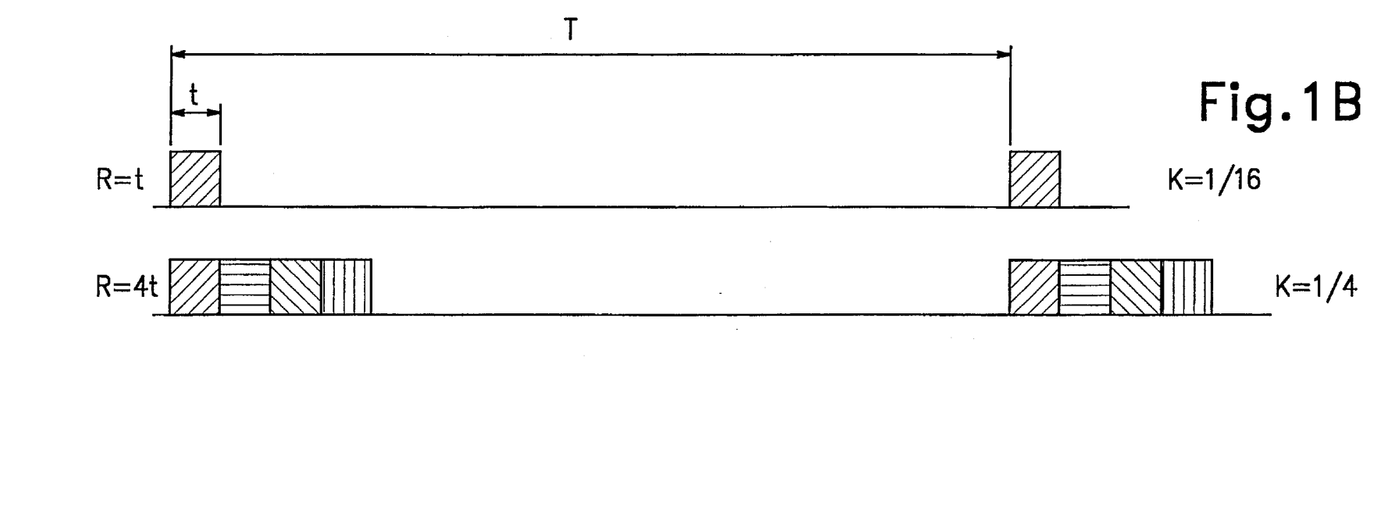

FIG. 1B illustrates the occupation of the fiber where R=t and where R=4t.

In the example shown:

R=t in the case of a 2 to 8 Mbit/s multiplexing

R=4t in the case of an 8 to 34 Mbit/s multiplexing.

For the demultiplexing, agitation distribution and diffusion functions, the optical switching function may be embodied, either by a lithium niobate optical switch or by a semiconductive optical amplifier used as a modulator where the control is electric. It is also possible to use logic optical gates (ET) optically addressable and it is this type of component retained for the description of the functions in the remainder of the description.

Figure 2A:
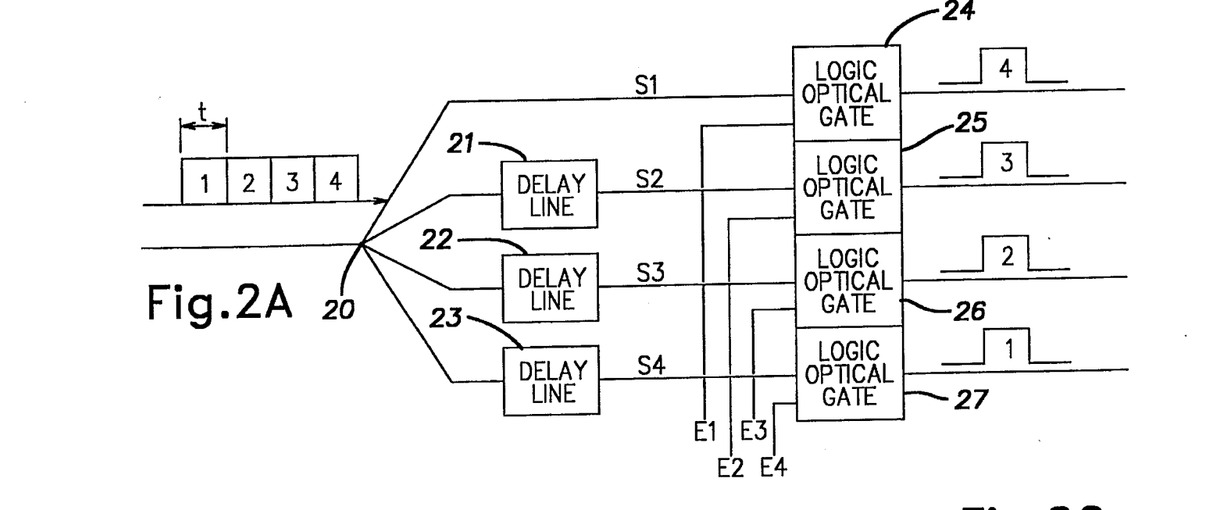
FIGS. 2A, 2B and 2C illustrate the structure and functioning of a multiplexer.
Figure 2B:
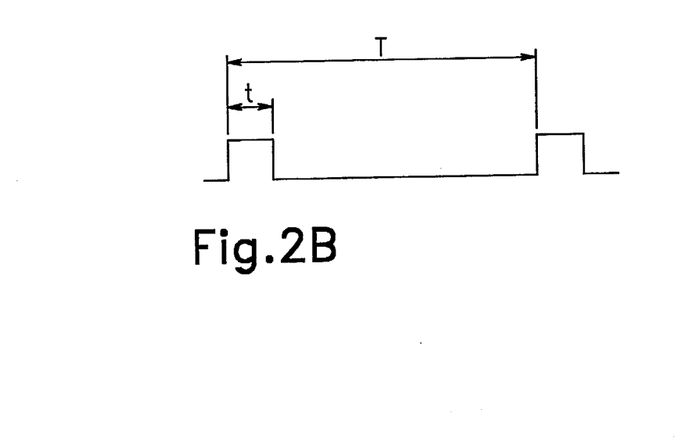
Figure 2C:
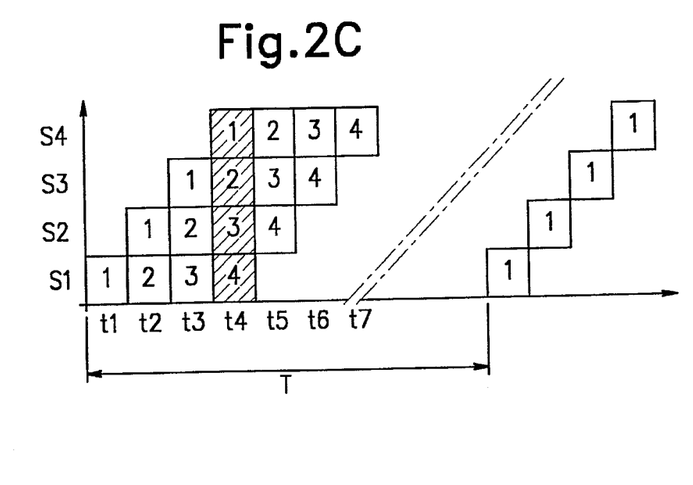

As shown on FIG. 2A, the demultiplexer is composed of a 1 to 4 coupler, a serializer formed of delay lines 21, 22 and 23 and four logic optical gates 24, 25, 26 and 27. The coupler and the serializer are identical to those described in the multiplexing function. The logic optical gates receive the signals Si derived from the serializer and the optical control signals Ei. In the case shown on FIG. 2A, these gates are simultaneously addressed at the instant t4, as shown on the diagram of times illustrated on FIG. 2C. FIG. 2B represents the control pulses of the inputs Ei of the optical gates at the instant t4.

Figure 3A:
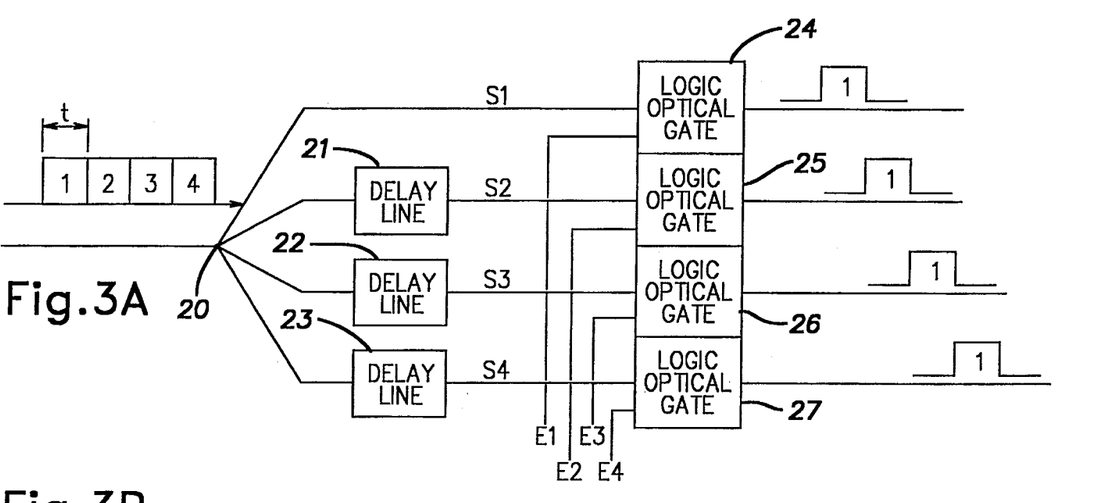
FIGS. 3A, 3B and 3C illustrate the structure and functioning of a diffuser.
Figure 3B:
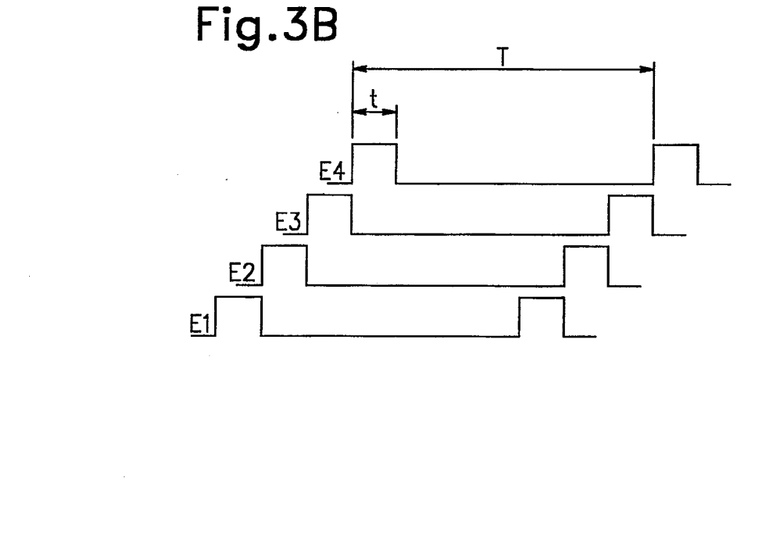
Figure 3C:
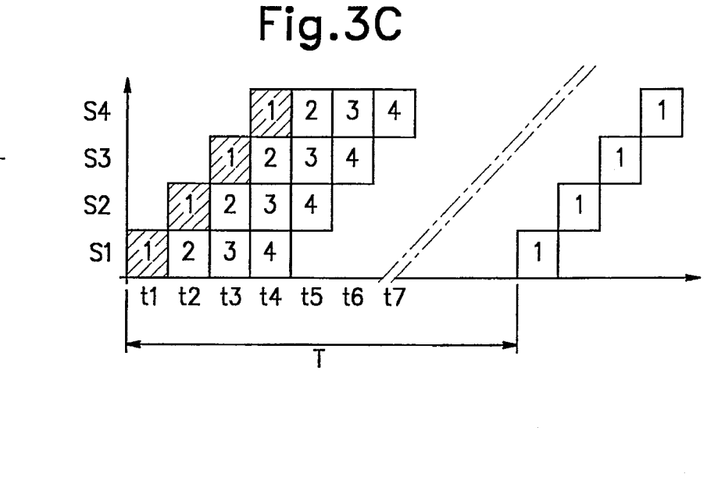

When the serializer is suppressed, all the signals at the inputs Si are in phase. If, as the preceding case, all the control signals Ei are also in phase, a "diffuser" function is carried out, each gate carrying the same packet. The number of this packet depends on the instant when the controls Ei are applied, as shown on FIGS. 3A, 3B and 3C corresponding to FIGS. 2A, 2B and 2C.

Figure 4A:
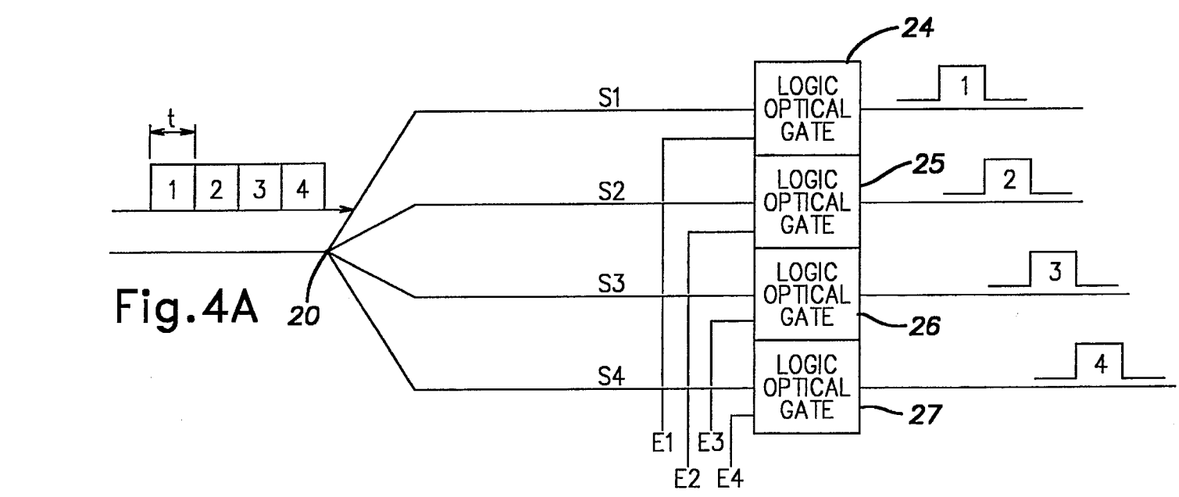
FIGS. 4A, 4B and 4C illustrate the structure and functioning of a reconfigurable demultiplexer.
Figure 4B:
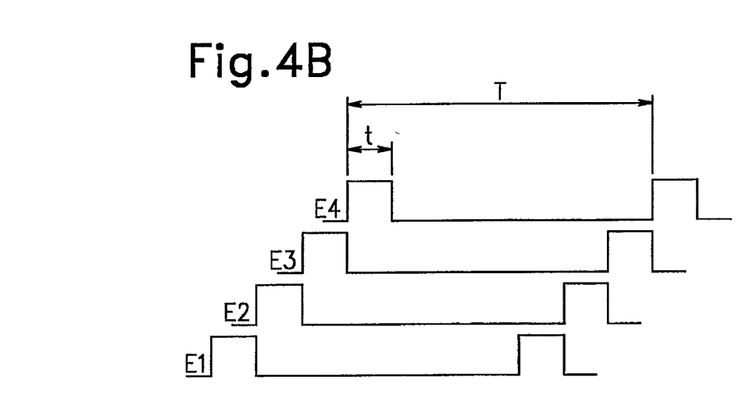
Figure 4C:
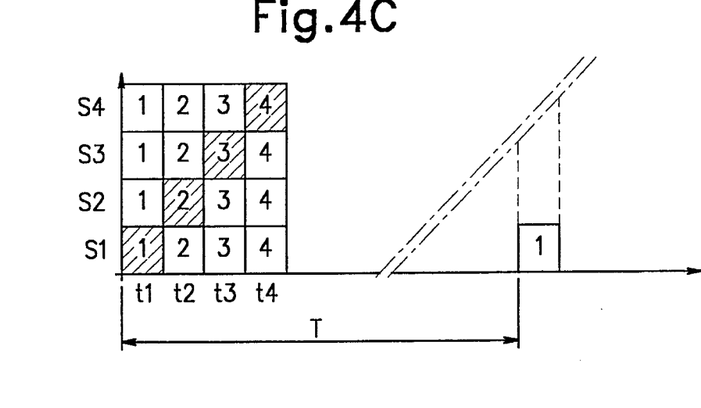

If the addressing instants of the inputs Ei are now managed separately, the system behaves like a reconfigurable demultiplexer, as shown on FIGS. 4A, 4B and 4C. The time-variable addressing of the inputs Ei offers the additional advantage of retaining the time positions of the packets.

Figures 5A, 5B:
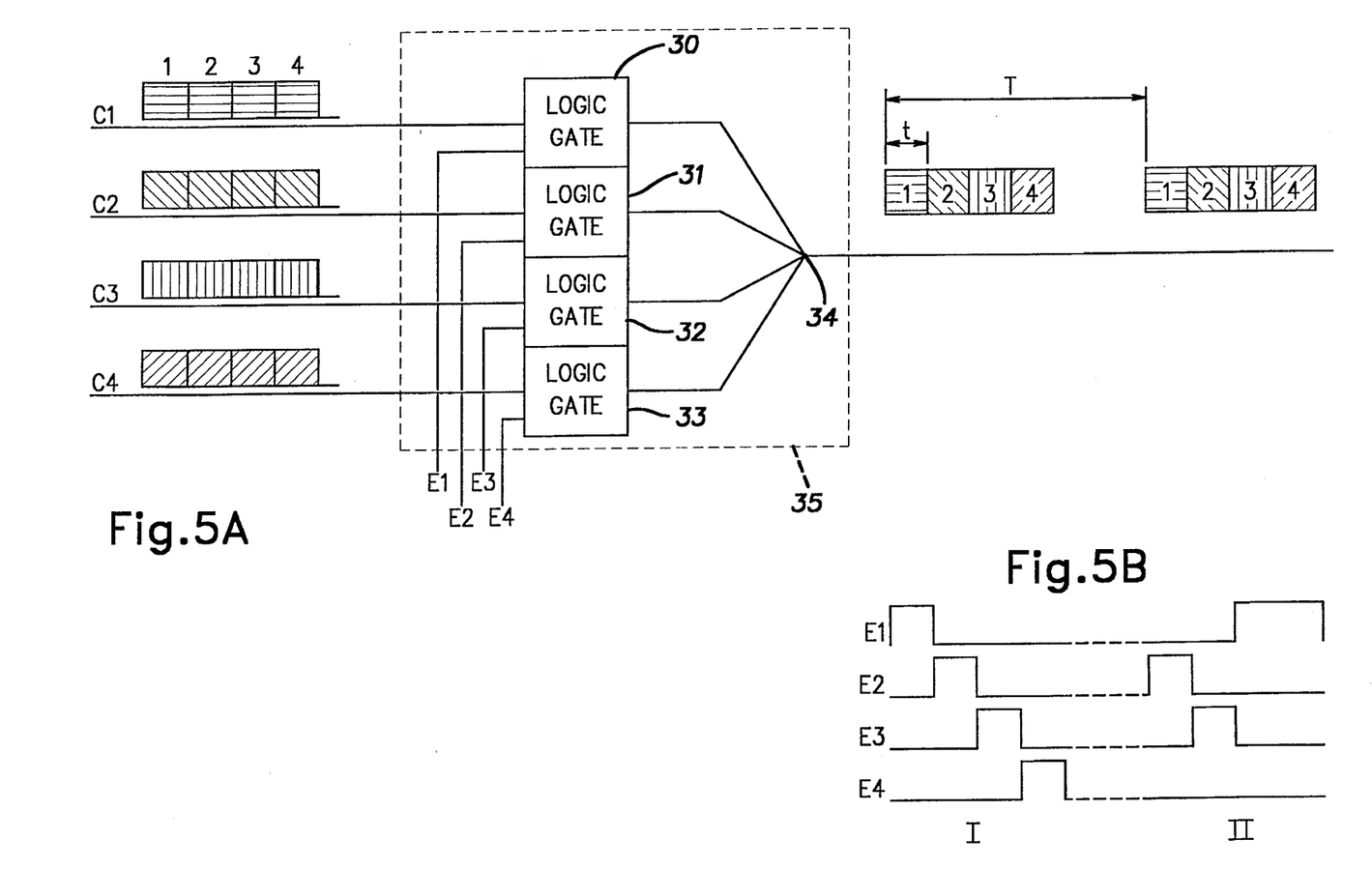
FIGS. 5A and 5B illustrate the structure and functioning of an agitation distributing frame.

FIG. 5A represents the elementary structure of an agitation distributor formed of four logic gates 30, 31, 32 and 33 and a 4 to 1 mixer 34. The configuration of the outgoing packets and associated with the diagram of the times of the pulses applied to the inputs Ei represented on FIG. 5B illustrates the behaviour of this elementary function. So as to be able to agitate any packet of any entering train, it is necessary to, not only manage the delays of the control pulses Ei (diagram of the time I), but also their periods (diagram of the time II).

Figure 6:
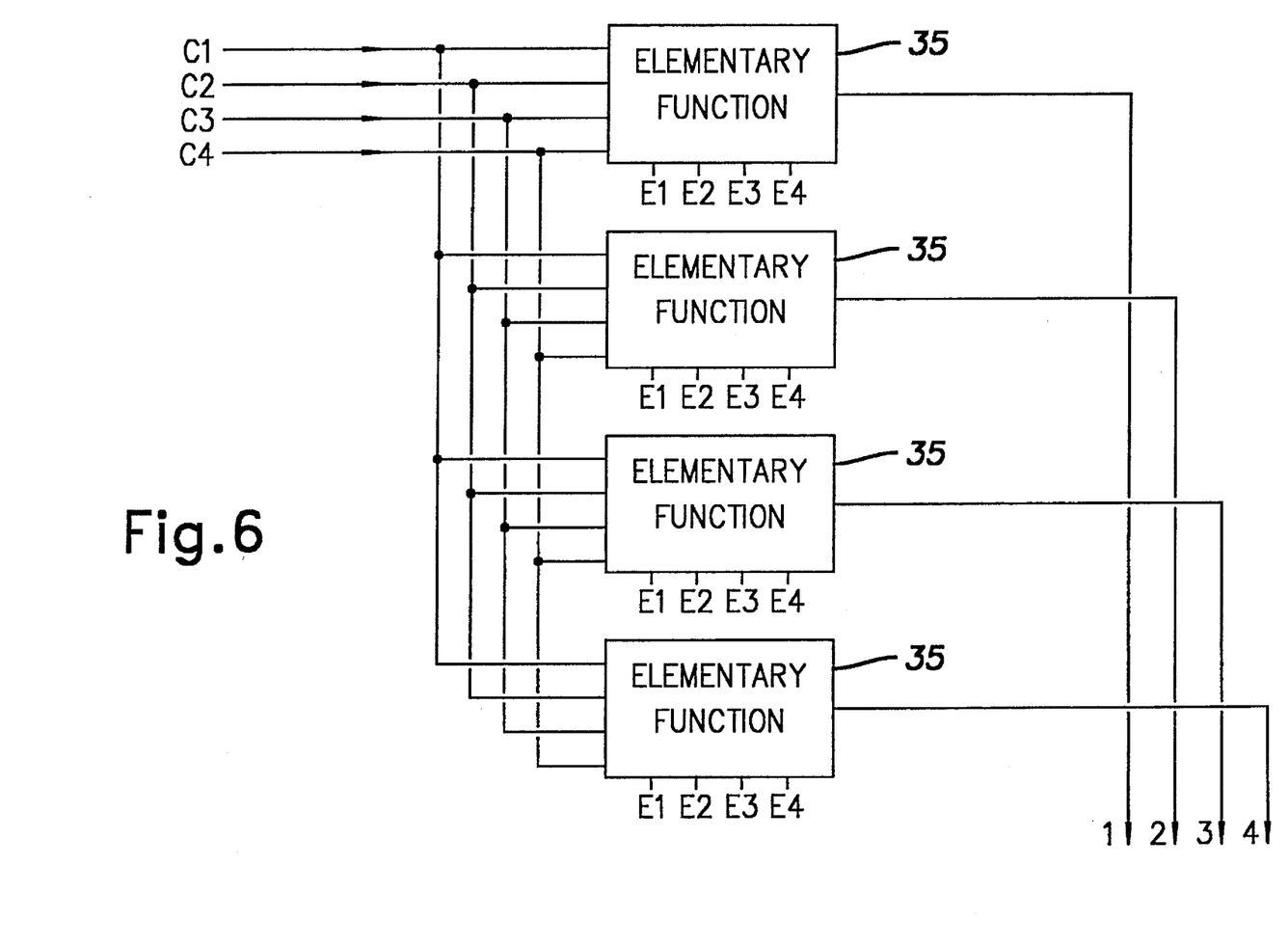
FIG. 6 illustrates an agitator including four modules as shown on FIG. 5A.

So as to be able to agitate any elementary packet towards any one of the four outgoing trains, it is essential to organize in the way shown on FIG. 6 four elementary functions 35, as shown on FIG. 5A.

The availability of tuneable optical filters and sources linked to the emergence of transposition functions makes it possible to envisage associating the parallelism of multicolored multiplexing with synchronous time-division.

A second embodiment of the invention concerns an organization based on a synchronous time-division multiplexing associated with a multicolored multiplexing or wavelength multiplexing. Organized synchronous packets are obtained in a "matrix" frame with:

in abscissae: sampling instants;

in ordinates: the wavelengths representing the level of parallelism of the packet.

Each packet is thus marked/in the "frame matrix" by its sampling window and its level of parallelism.

The optical function to be described shortly makes it possible to discriminate the parallelism levels (the wavelengths), and, although applied to train routing, also are applicable to the routing of colored packets.

In this organization, an attempt is made to conserve the transparence of optics with the format of the signals and direct access to the elementary channel. So as to illustrate the matter and define a wavelength comb, the PDH ("Plesiochrone Digital Hierarchy") and SDH digital multiplexing plan is taken by way of analogy. The equivalent capacity of a multicolored network is expressed by the product of the number of channels (number $\lambda$) by the elementary rate.

| Multiplex levels requirement | Number of $\lambda$ | Spacing | Spectral space spatial |
|---|---|---|---|
| 1 | 4 | 8 nm | 24 nm |
| 2 | 16 | 2 nm | 30 nm |
| 3 | 64 | 0.5 nm | 31.4 nm |
| 4 | 256 | 0.125 nm | 31.875 nm |

The sequence optical multiplexing level 4 is scarcely realistic considering the hypothesis of direct detection associated with optical filtering. The architecture of such a network presupposes three main operations; coloring of the tributaries by optical transposition, the mixing of channels and their selection by filtering.

Figure 7:
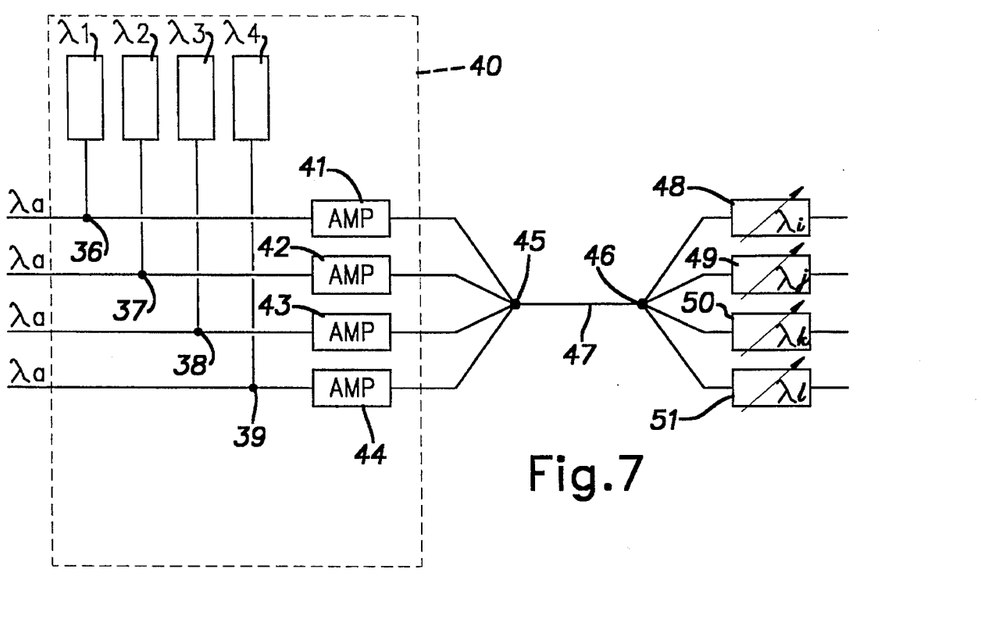
FIG. 7 illustrates the structure of a 4 to 1 elementary network.

FIG. 7 illustrates the structure of a 4 to 1 elementary network. The module 40 is a module for coloring tributaries of wavelengths $\lambda$ a with wavelengths $\lambda 1$, $\lambda 2$, $\lambda 3$ and $\lambda 4$. It comprises a coupler 36, 37, 38 or 39 followed by an amplifier 41, 42, 43 or 44 on each channel connected to a 4 to 1 mixer 45. This mixer 45 is connected to a 1 to 4 coupler 46 through an optical fiber 47. The outputs of this coupler are connected to selecting filters 48, 49, 50, 51.

This elementary architecture may also fulfill the distributing function since each tuneable filter can select any one of four incident channels.

So as to color the tributaries, the transposition function is able to optically transfer the information from one wavelength to another. Several techniques are possible by:

offsetting the emission frequency of a laser;

mixing four wavelengths in the semiconductiuve amplifiers;

non-linearity of the gain in the semiconductive amplifiers;

gain switching in the semiconductive amplifiers in an optical loop: synthesizer/transposer.

These last two techniques seem to be the most effective.

It is also possible to carry out optical transposition by saturating the gain in the semiconductive amplifiers. The transposer shown on FIG. 7 includes the following elements:

four 2 to 1 optical couplers (36, 37, 38, 39): one of the branches of each coupler receives the tributary at $\lambda A$, the other the continuous emission of the laser with "coloring" at $\lambda j$. The outgoing signals are injected into the semiconductive optical amplifiers (41, 42, 43, 44). At the output, the signal is obtained on the wavelength $\lambda A$ and its complement on the wavelength $\lambda j$;

four rejecting optical filters (48, 49, 50, 51): eliminate the wavelength $\lambda A$.

| | | | |
|---|---|---|---|
| PHD 2 Mb/s → 1 $\lambda$ | 8 Mb/s → 4 $\lambda$ | 34 Mb/s → 16 $\lambda$ | 140 Mb/s → 64 $\lambda$ |
| SDH 155 Mb/s → 1 $\lambda$ | 622 Mb/s → 4 $\lambda$ | 2550 Mb/s → 16 $\lambda$ | |

If it is desired to retain flexibility for organization of the network and in particular its size, it is essential to retain line optical amplifier use. The optical window available is henceforth limited by its passband and is 32 nm for a fiber amplifier. The table below shows a distribution of the wavelengths in this window.

For the coloring lasers, wavelength tuneable lasers are used to retain flexibility on adjusting the $\lambda i$.

It is also possible to use a synthesizer/transposer.

In the transposer described above, the coloring function presupposes two separate semiconductive components (SC): the tuneable laser and the transposer amplifier.

Figure 8A:
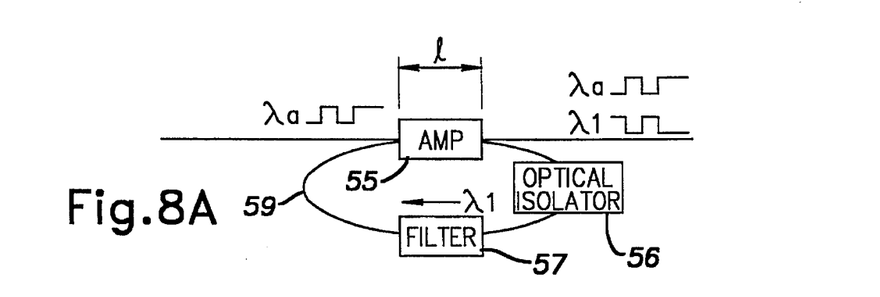
FIGS. 8A and 8B illustrate the structure and functioning of a transposer/synthesizer.

In the case of the synthesizer/transposer, the two functions are carried out by the amplifier 55 shown on FIG. 8A. It also includes an optical isolator 56 and a filter 57 tuneable to the frequency Fa.

Figure 8B:
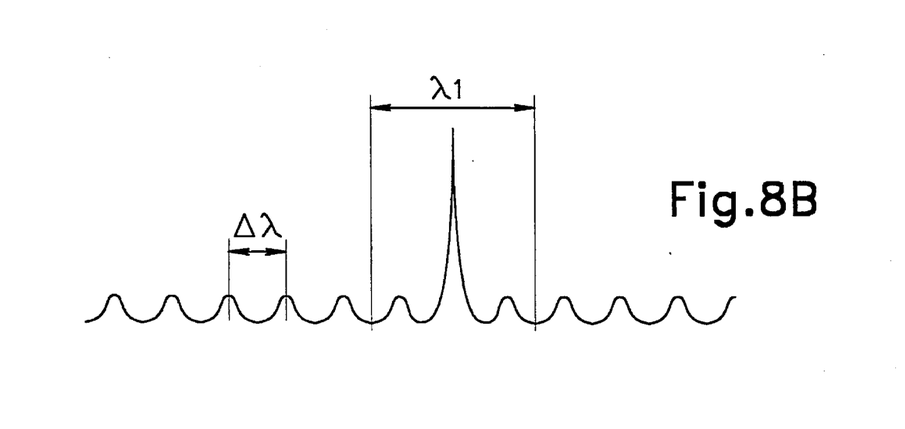

FIG. 8B shows the optical spectrum of this device.

The optical synthesizer is formed of a semiconductive optical amplifier 55 whose residual reflectivity of the faces has been deliberately kept to such a value that it generates a modulation of the spontaneous emission spectrum. The interval $\Delta\lambda$ between two successive resonances is fixed by the characteristics of the amplifier. $\Delta\lambda=\lambda2/2nl$ (n: effective group index, I length of the component). This amplifier 55 is placed in an optical fiber loop 59 including an optical isolator 56 and a tuneable Fabry Perot filter 57. This unit forms a laser which emits a wavelength $\lambda i$ (i=1 to N) each time the filter 57 coincides with any one of the resonances of the spontaneous emission. The tuneability of the filter 57 is able to pass through the wavelength comb in the entire gain band of the amplifier 55.

The number N of $\lambda$=free spectral interval of the filter/$\Delta\lambda$.

The optical isolator 56 isolates the amplifier 55 from the reflections of the filter 57 and fixes the direction of rotation of the light in the loop.

In the optical transposer shown on FIG. 7, an amplitude-modulated tributary signal $\lambda A$ is injected by an optical coupler into the optical synthesizer. The signal modulates the gain of the amplifier and the level of the power emitted to the wavelength $\lambda i$ by the synthesizer. The incoming information is thus transposed on the wavelength $\lambda j$.

The modulation speed of the injected signal $\lambda A$ is limited by the gain and size of the loop of the synthesizer. For dimensions of several centimeters, rates of about a hundred MHz may be attained.

The mixer 45 is formed of a 4 to 1 optical coupler per multiplexing stage.

The selector is formed of a 1 to N coupler 46 ($N=2^{2K}$, K multiplexing level). On each of the outgoing branches, a tuneable optical filter selects one channel from N.

In the case of the insertion/extraction function where it is desired to not demultiplex or remultiplex all the channels, this requires a component able to pick up and inject any one channel from N without disturbing the N-1 channels in transit.

Figure 9A:
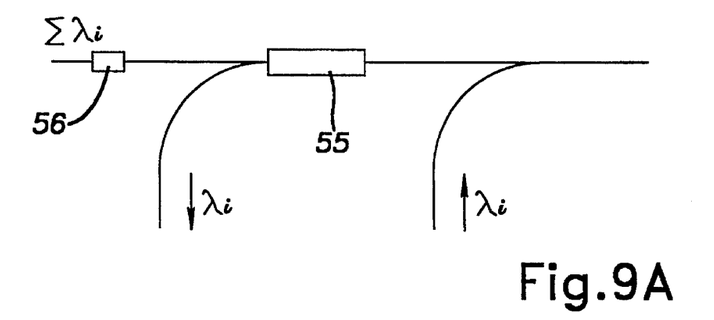
FIGS. 9A and 9B illustrate the structure and functioning of an insertion/extraction module.

FIG. 9A shows the architecture of this component able to be embodied from the fixed rejecting filter 55 and an optical isolator 56.

Figure 9B:
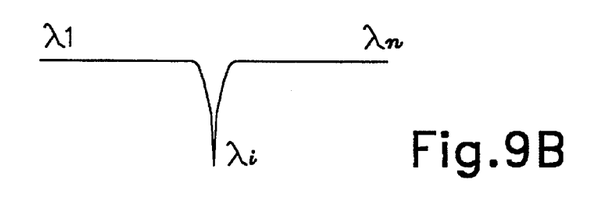

FIG. 9B shows the transfer function of a rejecting filter. The addressing of the channels is effected by dynamic emission or filtering. The choice depends for the most part of the compared tuneability of the sources and the filter.

Figure 10:
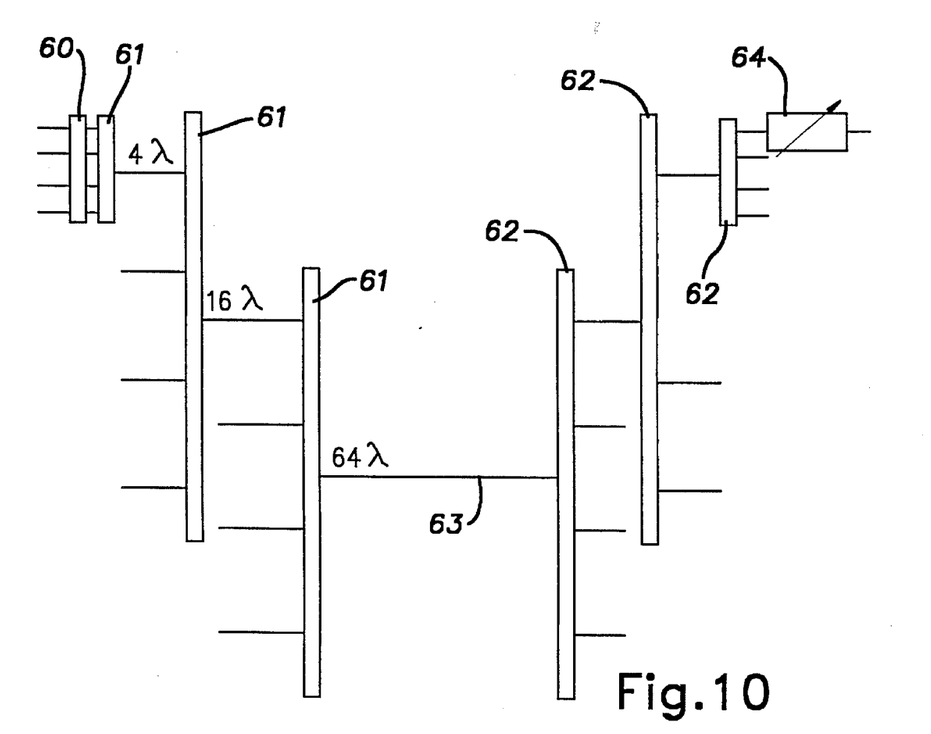
FIG. 10 illustrates the architecture of a 64 channel network.

FIG. 10 shows the architecture of a network of 64 channels. It includes a coloring module 60, a certain number of 1 to 4 mixers 61, an optical fiber 63, couplers 62 and filters 64.

In the previously fixed hypothesis of a rate determined by the time-division occupation of a conduit, the number of 2 Mbit/s channels in the full 140 Mbit/s rate is 64, each of them being marked by the sampling instant $t_j$ (j=1 to 64). If the transmission optical band is taken as that of the doped fiber amplifiers, namely 32 nm, the table below shows that a level parallelism 64 is accessible.

|  | Spacing | Spatial requirement |
|---|---|---|
| 4 $\lambda$ | 8 nm | 24 nm |
| 16 $\lambda$ | 2 nm | 30 nm |
| 64 $\lambda$ | 0.5 nm | 31.5 nm |
| 256 $\lambda$ | 0.125 nm | 31.865 nm |

Figure 11:
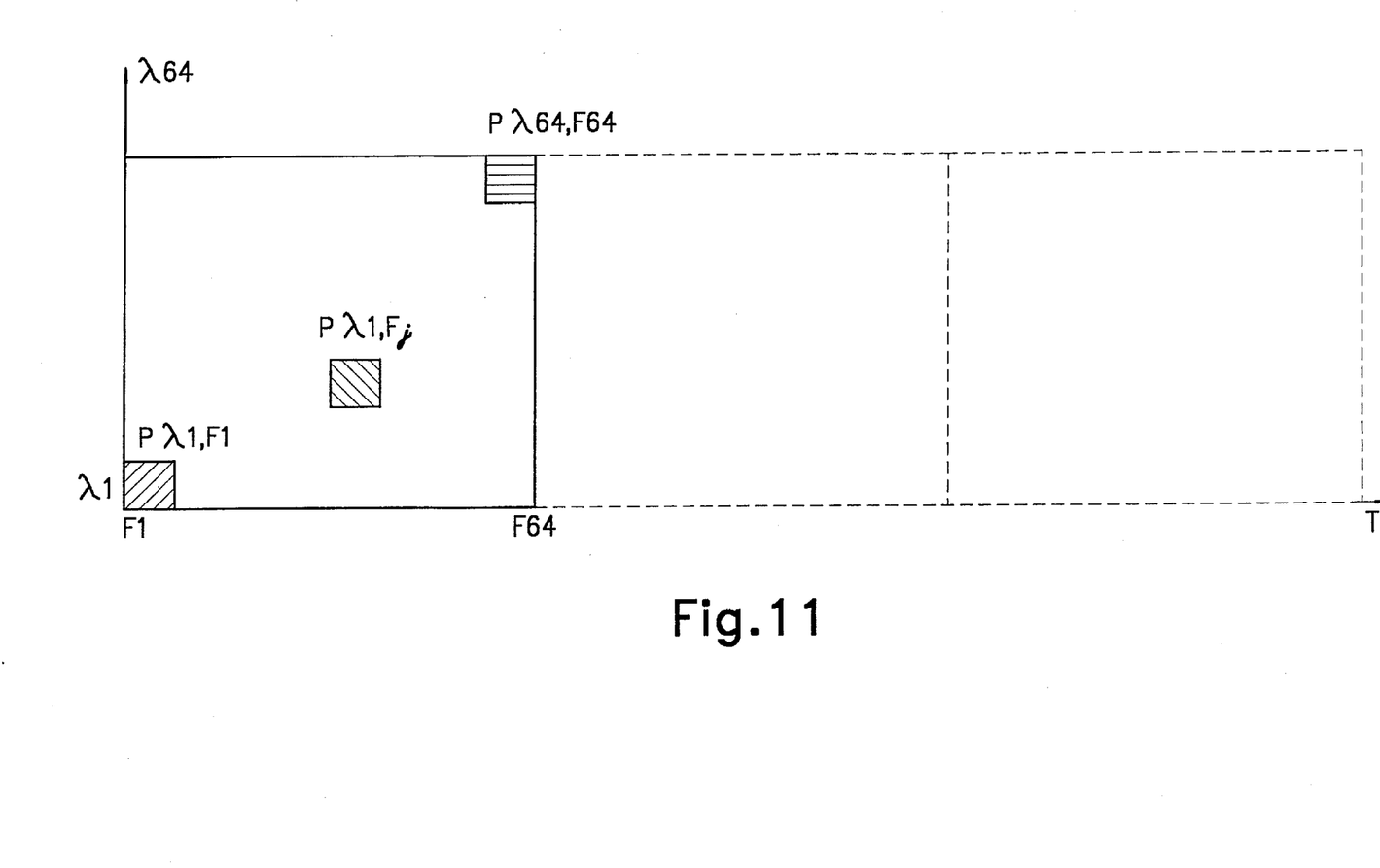
FIG. 11 illustrates the matrix of a frame associating time-division and parallelism.

In this type of network, any 2 Mbit/s channel is marked by $\lambda i$ and its time-division window $t_j$ (t representing the period of the packet), as shown on FIG. 11.

The capacity of the network is the product of the elementary rate by the instant number tj (64) and the number of $\lambda i$ (64), namely:

$$C=64\times64\times2 \ Mbit/s=8192 \ Mbit/s.$$

So as to ensure synchronism of the time-division windows allocated to the tributaries, it is necessary to address the buffer memory read control from the central device managing synchronism. The significant time interval availability (T) between the emission of two successive packets can conceive an alternate functioning of the distant tributary laser. This laser then functions sometimes as a receiver of the signals emitted by the central device to the buffer memory or sometimes as a transmitter of the information packets.

The control signals emitted by the central managing device determine the time-division position of the emission window. When the tributary is formatted into packets and allocated to its time-division window, it traverses a coloring stage.

This coloring is based on optical transposition. This stage determines the level of parallelism of the tributary by transposing it on a specific wavelength, as shown on FIG. 12 illustrating a stage for shaping the tributaries.

The tributary packets are thus allocated on one of the N positions of the "frame" matrix: N=M*P (M: number of time-division windows, P:number of wavelengths).

Figure 12:
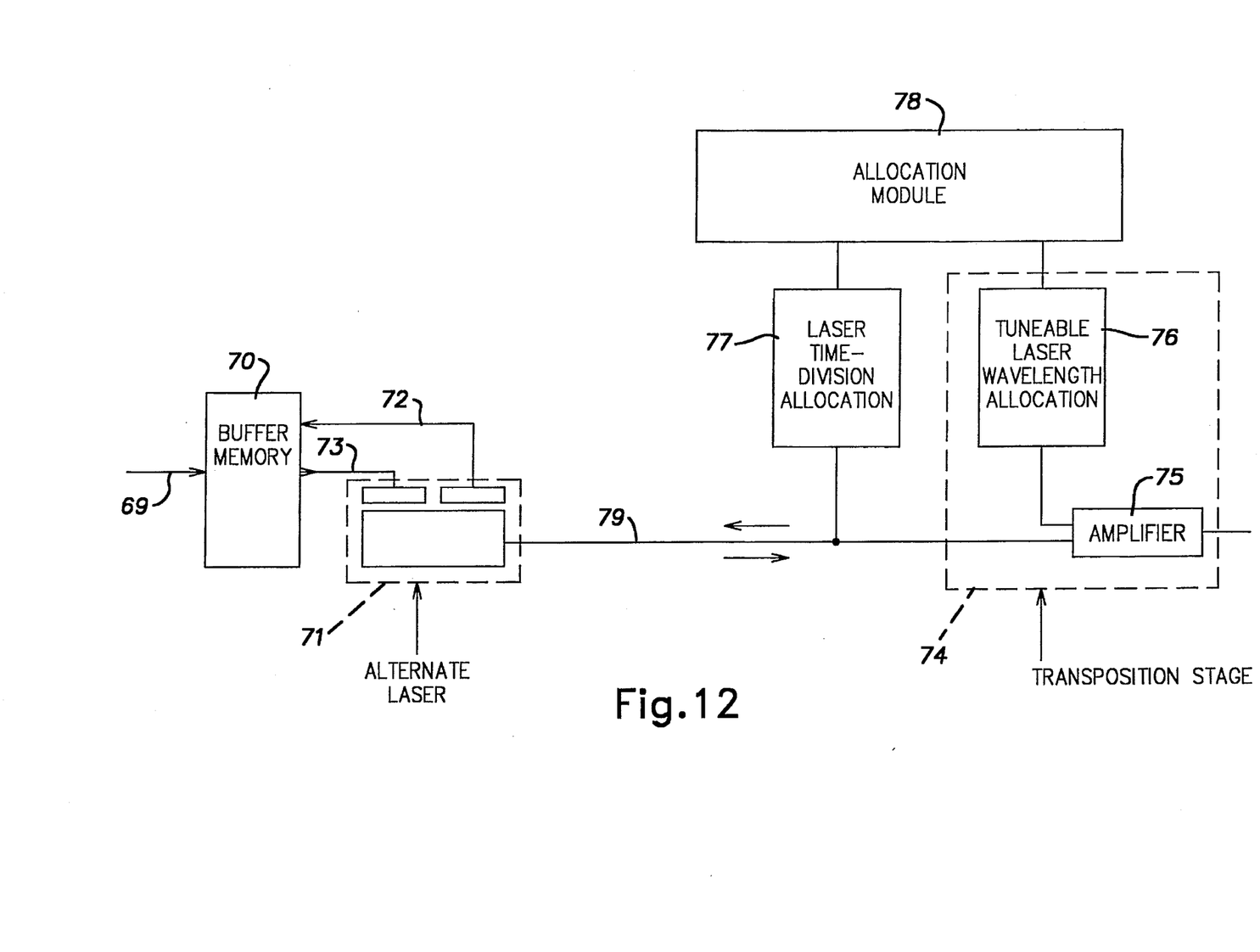
FIG. 12 illustrates a circuit implementing the tributaries.

FIG. 12 shows a tributary at 2 Mbit/s 69 entering a buffer memory 70 connected to an alternate laser 71 by a read connection 72 and a write connection 73. This laser 71 is also connected by means of an optical fiber 79 to a transposition stage 74 including an amplifier 75 and a tuneable laser 64 $\lambda$, 76 and to a laser 77. A selection module 78 of the time-division Fj and allocation window $\lambda i$ is connected to this transposition stage 74 and this laser 77.

Figure 13:
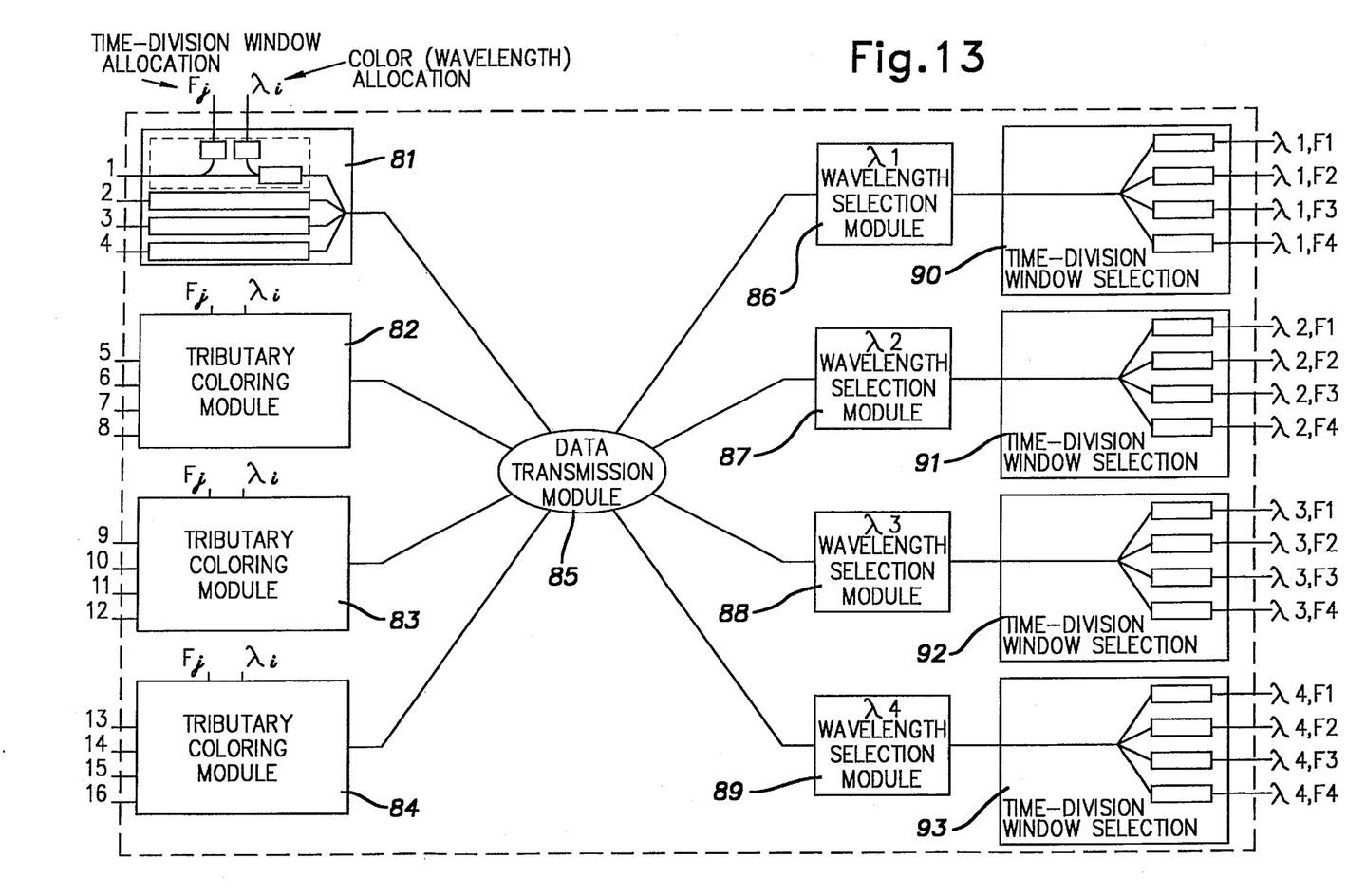
FIG. 13 illustrates a 16×16 matrix.

FIG. 13 shows in diagram form the configuration of a 16×16 matrix with modules 81, 82, 83 and 84 for coloring the tributaries, a data transmission module 85, wavelength allocation modules 86, 87, 88 and 89 and modules 90, 91, 92 and 93 allowing for selective filtering.

What is claimed is:

1. Device for transmitting and switching packets in an optical network, said device including a transposer, said transposer comprising:

N 2 to 1 optical couplers, a first input branch of each coupler receiving a tributary signal at a wavelength $\lambda A$, a second input branch of each coupler receiving a continuous emission of a coloring laser at a wavelength $\lambda i$, an output of each optical coupler being transmitted to one of N first semiconductive optical amplifiers, an output of each of said first semiconductive optical amplifiers comprising a signal at the wavelength $\lambda A$ and a complementary signal at the wavelength $\lambda i$;

an N to 1 mixer which receives said outputs of said first semiconductive optical amplifiers, said mixer having an output;

an optical fiber connecting said mixer output to a i to N coupler, said 1 to N coupler having N outputs, each output of said 1 to N coupler having a rejecting filter which eliminates the wavelength $\lambda A$; and, synthesizer/transposers which function as a tuneable laser and a transposer amplifier, each of the synthesizer/transposers includes an optical fiber loop comprising a second semiconductive optical amplifier, an optical isolator, and a tuneable Fabry Perot filter, and wherein a residual reflectivity of each of the second optical amplifiers is such that said second optical amplifiers generate a modulation of a spectrum of a spontaneous emission, and each of said optical fiber loops define a laser which emits the wavelength $\lambda i$ (i=1 to N) each time the filter coincides with a resonance of the spontaneous emission.

2. Device for transmitting and switching packets in an optical network, said device including a transposer, said transposer comprising:

N 2 to 1 optical couplers, a first input branch of each coupler receiving a tributary signal at a wavelength $\lambda A$, a second input branch of each coupler receiving a continuous emission of a coloring laser at a wavelength $\lambda i$, an output of each optical coupler being transmitted to one of N first semiconductive optical amplifiers, an output of each of said first semiconductive optical amplifiers comprising a signal at the wavelength $\lambda A$ and a complementary signal at the wavelength $\lambda i$;

an N to 1 mixer which receives said outputs of said first semiconductive optical amplifiers, said mixer having an output;

an optical fiber connecting said mixer output to a 1 to N coupler, said 1 to N coupler having N outputs, each output of said 1 to N coupler having a rejecting filter which eliminates the wavelength $\lambda A$; and, an allocation module comprising a buffer memory, an alternate laser, a second laser, and a transposition stage, wherein said buffer memory is connected to said alternate laser by a read connection and a write connection, the alternate laser is connected by an optical fiber to said transposition stage and said second laser, said transposition stage including an amplifier and a tuneable laser, and wherein a selection module of a time-division Fi and allocation window $\lambda j$ is connected to said transposition stage and said second laser, and wherein allocation of time-division windows is controlled from a central device so that all packets appear at appropriate instants at an input of a switching matrix.

* * * * *

UNITED STATES PATENT AND TRADEMARK OFFICE
CERTIFICATE OF CORRECTION

PATENT NO. : 5,589,967
DATED : December 31, 1996
INVENTOR(S) : Rene Auffret

It is certified that error appears in the above-indentified patent and that said Letters Patent is hereby corrected as shown below:

On the title page, Section [57] Abstract, lines 6 and 7, delete "The present invention also concerns a device for transmitting and switching packets in an optical network.--.

Column 5, line 36, delete "marked/in" and insert --marked in--.

Column 5, line 53, delete "PHD" and insert --PDH--.

Column 8, line 57 (Claim 1, line 16), delete "i" and insert --1--.

Signed and Sealed this

Twenty-second Day of July, 1997

Attest:

BRUCE LEHMAN

Attesting Officer

Commissioner of Patents and Trademarks